Sept. 29, 1959  G. S. MITTELSTAEDT  2,906,881
RADIOGRAPHS IN CONTRASTING COLOR
Filed Nov. 4, 1958
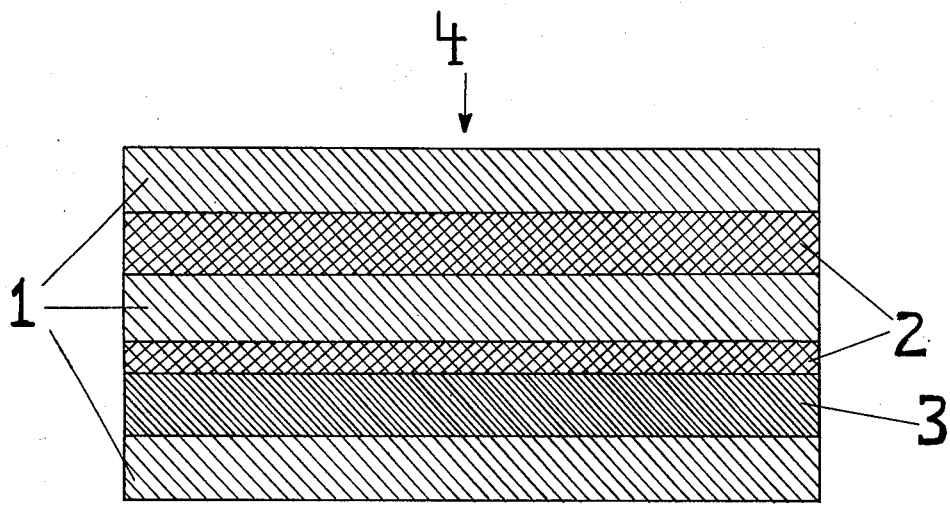
Inventor
Georg Mittelstaedt

2,906,881

RADIOGRAPHS IN CONTRASTING COLOR

Georg S. Mittelstaedt, Brooklyn, N.Y.

Application November 4, 1958, Serial No. 771,720

8 Claims. (Cl. 250—65)

This invention relates to radiography, and it is the main object of this invention to produce radiographs in contrasting color.

The above and other objects will become apparent in the description below. In connection with the description, the accompanying drawing shows in diagrammatic greatly enlarged form light sensitive layers, used in association with penetrating radiation absorbing screens and intensifying screens, all shown in section.

Referring in detail to the drawing, the numeral 1 indicates light sensitive layers, which are preferably also color sensitive. The numeral 2 indicates absorbent screens, preferably of the lead type, for partially absorbing the penetrating radiation. The absorption degree of said absorbent screens preferably decreases in successive layers. The numeral 3 indicates an intensifying screen disposed behind an X-ray absorbing screen, for amplifying the illumination effect of the penetrating rays behind said X-ray absorbing screen. The numeral 4 indicates the direction of the penetrating radiation.

X-rays, gamma rays and related radiation are absorbed to different degrees by different media, the absorption depending upon the pentrating power or wave length of the rays, and upon the density of the media. For instance, X-rays passing through the tissues of the human body are absorbed in proportion to the density of the tissue. The bones absorb most of the rays, and the fluorescing screen behind the bones appears dark or black. The muscles and soft tissues absorb only a small portion of the rays, and the fluorescing screen behind the muscles and soft tissues appears gray. Diseased tissue will usually absorb less radiation than sound tissue, and the fluorescing screen behind such diseased tissue appears lighter than behind sound tissue. If diseased tissue should absorb more radiation than related sound tissue, then the fluorescing screen behind the diseased tissue will appear darker than behind sound tissue. If instead of a fluorescent screen a photographic plate is exposed to the X-rays, the negative will show dark areas where the fluorescing screen showed light areas and vice versa.

The analysis of color radiographs involves the recording of X-rays of unlike radiation magnitude or intensity on two or more emulsions of preferably different emulsion speed. In this invention, by the term "X-rays" is also meant gamma rays, or related radiation.

X-rays are absorbed by the subject to different degrees in proportion to varying density, and they leave the subject in a corresponding pattern of varying intensity or magnitude of radiation. For instance, an emulsion exposed behind the chest will record the area which was not absorbed by the bone structure, these areas being shown on the developed negative as silver densities. The actual densities will bear a definite relation to the magnitude of radiation from each subject area, and the photographic density is a quantitative measure of the X-rays emitted from the various subject areas.

If the emulsion layer is treated with a radiation absorbing substance, or if the film or emulsion layer is followed by a layer of radiation absorbing material, for instance a thin lead foil screen, this absorbent screen will absorb the weaker rays emitted from the emulsion. If said radiation absorbing screen is followed by a second film or emulsion layer, sandwich like, the emulsion exposed behind said absorbent screen will record the radiation which passed through the subject areas of relatively little density, and will record the areas which were not absorbed by the bone structure and absorbent screen, these areas being shown on the developed second negative as silver densities. The actual densities will bear a definite relation to the magnitude of radiation emitted from the absorbent screen, and photographic density is again a quantitative measure.

Therefore a two stage radiation magnitude analysis of the original subject is obtained in the form of two photographic negatives, one being a "normal absorption record," the other a "double absorption record."

If another radiation absorbing screen and another emulsion layer is added, sandwich like, three radiation magnitude records are made, the first being a "normal absorption record," the second being a "double absorption record," the third being a "triple absorption record," and a three stage radiation magnitude analysis results.

The photographic negatives may be dyed in contrasting colors and combined, or may be projected through filters of contrasting color and combined, to form a density record or radiograph of contrasting color; but the synthesis of the photographic analysis may take any of the many different and well known physical and chemical forms, depending on whether the synthesis is to be additive or subtractive and on the method of image formation.

The synthesis of color radiography corresponds with the synthesis of color photography. In color photography the photographic densities of the dyed negatives are quantitative measures of colored light present in the subject. In color radiography the photographic densities of the dyed negatives are quantitative measures of the X-rays emitted from the various subject areas.

Since the radiation magnitude is decreased by the absorbent screen between the first and second emulsion layer, the second layer has preferably a higher emulsion speed than the first layer. And since the radiation magnitude is decreased again by the radiation absorbing screen between the second and third emulsion layer, the third layer has preferably a higher emulsion speed than the second layer.

All layers are usually exposed at one time, but film layers may also be exposed separately, the second and third film layer using corresponding radiation absorbing screens.

The film, and especially the last layer, may be used in combination with intensifying screens consisting for instance of a layer of calcium tungstate which fluoresces under the influence of X-rays, the fluorescent light augmenting the exposure caused by the X-rays.

Any of the emulsion layers, and especially the last one, may be treated with a fluorescing substance to transform the short wave length of the X-rays into longer ones, for augmenting the exposure caused by the X-rays. The ethyl carboxylic ester of dihydrocollodium for instance is suited for this purpose.

The analysis of color radiographs may involve the recording of X-rays of unlike radiation magnitude on two or more color-sensitive emulsions of preferably different emulsion speed. As an example, red and blue sensitive layers are coated on film, each layer containing dispersed particles containing couplers, and each layer preferably having a different emulsion speed. The first layer may be treated with a radiation absorbing substance, preferably a lead substance which may be removed in the developing process; or an absorbent layer, preferably lead, may be arranged between the layers. After exposure, the film is processed with a developer the oxidation products of which react with the couplers to give silver plus dye images in each layer. The silver is removed and a radiographic negative in contrasting color results. If red, green and blue sensitive emulsion layers are used, a multi-color radiographic negative results, in which the various densities of the subject are recorded in contrasting colors.

The negative may be projected, or it may be printed unto paper coated with a similar set of emulsions, and processed in the same way, and prints are obtained in which the various densities of the subject are recorded in contrasting colors.

If separate supports are used for the emulsion layers, the couplers may be incorporated into the developer instead of in the emulsion and the couplers may be enclosed in very small globules of organic compounds. The dyes are formed within the globules as the developer solution penetrates them, resulting in negatives of contrasting colors. The negatives are combined, resulting in a radiograph in which the various densities of the subject are recorded in contrasting colors.

The invention may be used in connection with the well known dot system, where colorsensitive emulsion dots of different emulsion speeds may be arranged on a single support, and the invention may be used in connection with fluorescent screens, where fluorescent salts are utilized instead of silver salts.

Physical and chemical changes may be made without departing from the spirit or scope of this invention.

I claim:

1. In combination with penetrating radiation, an arrangement for producing a photographic density analysis, comprising a plurality of successively disposed photographic emulsion layers, and a lead screen disposed between said emulsion layers for completely absorbing the lower intensities of X-rays emanating from the preceding emulsion layer.

2. In combination with penetrating radiation, an arrangement for producing a photographic density analysis, comprising a plurality of successively disposed photographic emulsion layers, and a screen disposed between said emulsion layers, said screen containing X-ray absorbing substance and completely absorbing select intensities of X-rays emanating from the preceding emulsion layer.

3. In combination with penetrating radiation, an arrangement for producing a photographic density analysis, comprising a plurality of successively disposed photographic emulsion layers, and a screen disposed between said emulsion layers, said screen containing X-ray absorbing substance and completely absorbing the lower intensities of X-rays emanating from the preceding emulsion layer.

4. A system according to claim 3, intensifying means behind said screen for amplifying the illumination effect of the X-rays emanating therefrom.

5. A system according to claim 3, an amplification foil behind said screen, and in juxaposition to a separate emulsion layer for amplifying the exposure illumination thereof.

6. A system according to claim 3, means to dye at least one emulsion layer.

7. A system according to claim 3, at least one emulsion layer being adapted to produce color.

8. Means to produce radiographs in contrasting color, comprising a radiation source with penetrating rays emanating therefrom, a subject exposed to said penetrating rays, various intensities of X-rays emanating from said subject, an arrangement of photographic emulsion layers and X-ray absorbing screens exposed to the X-rays emanating from said subject, said emulsion layers being adapted to produce different colors, said arrangement comprising a first emulsion layer exposed to all intensities of X-rays emanating from the subject, a first X-ray absorbing screen disposed behind said first emulsion layer for completely absorbing the low intensities of X-rays emanating from the subject, a second emulsion layer disposed behind said first X-ray absorbing screen and exposed to the medium and high intensities of X-rays emanating from the subject, a second X-ray absorbing screen disposed behind said second emulsion layer for completely absorbing the medium intensities of X-rays emanating from the subject, a third emulsion layer disposed behind said second X-ray absorbing screen and exposed to the high intensities of X-rays emanating from the subject.

References Cited in the file of this patent

UNITED STATES PATENTS

| | | |
|---|---|---|
| 2,644,096 | Fine | June 30, 1953 |
| 2,807,725 | Schwerin | Sept. 24, 1957 |
| 2,844,732 | Hartmann | July 22, 1958 |
| 2,844,734 | Hartmann | July 22, 1958 |